United States Patent
Povirk et al.

(10) Patent No.: US 8,265,842 B2
(45) Date of Patent: Sep. 11, 2012

(54) ELECTRONIC LOCKING DIFFERENTIAL

(75) Inventors: Jacob M. Povirk, Franklin, MI (US); John R. Saieg, Wixom, MI (US); Gary M. Pietrzyk, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 409 days.

(21) Appl. No.: 12/507,903

(22) Filed: Jul. 23, 2009

(65) Prior Publication Data

US 2011/0022279 A1    Jan. 27, 2011

(51) Int. Cl.
  *G06F 7/00* (2006.01)
(52) U.S. Cl. ............... 701/67; 475/157; 701/68
(58) Field of Classification Search ............ 701/67, 701/68; 475/157, 231, 308
See application file for complete search history.

(56) References Cited

U.S. PATENT DOCUMENTS

| | | | | |
|---|---|---|---|---|
| 5,332,059 A * | 7/1994 | Shirakawa et al. | ........... | 180/197 |
| 5,582,263 A * | 12/1996 | Varma et al. | .................. | 180/247 |
| 5,742,917 A * | 4/1998 | Matsuno | .......................... | 701/69 |
| 5,853,342 A * | 12/1998 | Pritchard et al. | .............. | 475/206 |
| 5,996,719 A * | 12/1999 | Galli | ............................ | 180/233 |
| 6,083,134 A | 7/2000 | Godlew | | |
| 6,551,209 B2 | 4/2003 | Cheadke et al. | | |
| 6,631,320 B1 * | 10/2003 | Holt et al. | .......................... | 701/83 |
| 6,755,763 B1 * | 6/2004 | Goto et al. | ..................... | 475/231 |
| 6,945,895 B2 | 9/2005 | Fusegi et al. | | |
| 7,040,445 B2 * | 5/2006 | Ishii et al. | .................... | 180/307 |
| 7,111,702 B2 * | 9/2006 | Perlick et al. | ................. | 180/233 |
| 7,399,248 B2 * | 7/2008 | Kleinhans et al. | ............ | 475/236 |
| 7,693,639 B2 * | 4/2010 | Suzuki et al. | .................... | 701/71 |
| 2002/0155913 A1 | 10/2002 | Fusegi et al. | | |
| 2003/0033070 A1 * | 2/2003 | Amanuma et al. | .............. | 701/67 |
| 2003/0162622 A1 | 8/2003 | Fusegi et al. | | |
| 2003/0201134 A1 * | 10/2003 | Ishii et al. | ..................... | 180/307 |
| 2003/0218378 A1 * | 11/2003 | Tanaka et al. | ................. | 303/146 |
| 2004/0267427 A1 * | 12/2004 | Suzuki et al. | ................... | 701/69 |
| 2005/0072621 A1 * | 4/2005 | Hara et al. | ..................... | 180/444 |
| 2005/0145421 A1 * | 7/2005 | Ishimori | ...................... | 180/6.32 |
| 2005/0279562 A1 * | 12/2005 | Hara et al. | ..................... | 180/402 |
| 2007/0066436 A1 * | 3/2007 | Bowen | ......................... | 475/201 |
| 2007/0250236 A1 * | 10/2007 | Newberry et al. | .............. | 701/51 |
| 2008/0176702 A1 * | 7/2008 | Showalter | ...................... | 475/204 |
| 2008/0255735 A1 * | 10/2008 | Marathe et al. | ................. | 701/50 |
| 2009/0011890 A1 * | 1/2009 | Bawks | .......................... | 475/231 |
| 2009/0055060 A1 * | 2/2009 | Minami | .......................... | 701/54 |
| 2011/0082634 A1 * | 4/2011 | Povirk et al. | ..................... | 701/88 |

* cited by examiner

*Primary Examiner* — Helal A Algahaim
(74) *Attorney, Agent, or Firm* — David B. Kelley; MacMillan, Sobanski & Todd, LLC

(57) ABSTRACT

A method for controlling a clutch of an electronic locking differential for a vehicle includes determining either that a speed of the vehicle is less than a reference speed or that a desired state of the clutch is a disengaged state, determining that an angular displacement of a steering wheel from a centered position is less than a first reference angle, and disengaging the clutch.

6 Claims, 4 Drawing Sheets

ELECTRONIC LOCKING DIFFERENTIAL

BACKGROUND OF THE INVENTION

1. Field of the Invention

The invention relates generally to a differential mechanism, which transmits rotating power to the wheels of a motor vehicle.

2. Description of the Prior Art

A locker clutch can be used in a differential mechanism to secure one of the side gears and its axle shaft against rotation relative to the differential carrier, thereby enhancing traction of the driven wheels that are supplied with power through the differential.

When actuated, an electronic locking differential (ELD) mechanically connects a side gear to the differential case using an electrically-controlled lock mechanism, typically a dog clutch.

When the clutch is engaged, the electronic locking differential prevents relative speed differentials across the controlled wheels and transmits full engine combustion torque amplified by the transmission and axles torque ratios and reduced by efficiency and rotational losses, to the controlled wheels.

With the electronic locking differential engaged the maximum axle/transaxle input torque (AIT) is limited to the combined skid torque of the controlled wheels.

With the electronic locking differential engaged while cornering the torque across the differential is the delta between the left and right axle shaft torque and bound by the engaged dog clutch. The torque delta is a function of coefficient of friction surface, tire surface area turning radius and maximum gross vehicle weight.

A need exists for a control strategy that detects when the lock mechanism of an ELD is torque bound due to control wheel differential speed and enables rapid controlled disengagement of the lock mechanism when the differential speed across the controlled wheels decreases below a calibrated reference speed by applying the brakes.

SUMMARY OF THE INVENTION

A method for controlling a clutch of an electronic locking differential for a vehicle includes determining either that the speed of the vehicle is greater than a reference speed or that a desired state of the clutch is a disengaged state, determining that an angular displacement of a steering wheel from a centered position is less than a first reference angle, and disengaging the clutch.

If neither the speed of the vehicle is greater than the reference speed nor the desired state of the clutch is the disengaged state, and the displacement of the steering wheel changes from greater than a second angle to less than the second angle, the clutch is disengaged after a first period expires.

The control (i) reduces cumulate damage on the ELD locking mechanism, (ii) accommodates torsional displacement of the lock mechanism of an ELD due to control wheel differential speed and (iii) enables rapid, controlled disengagement of the lock mechanism when conditions for its disengagement are present. The strategy accounts for differential speed across the driven wheels, steering wheel angle, vehicle speed and the state of a manually operated switch used to select a desired state of the lock mechanism and differential.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
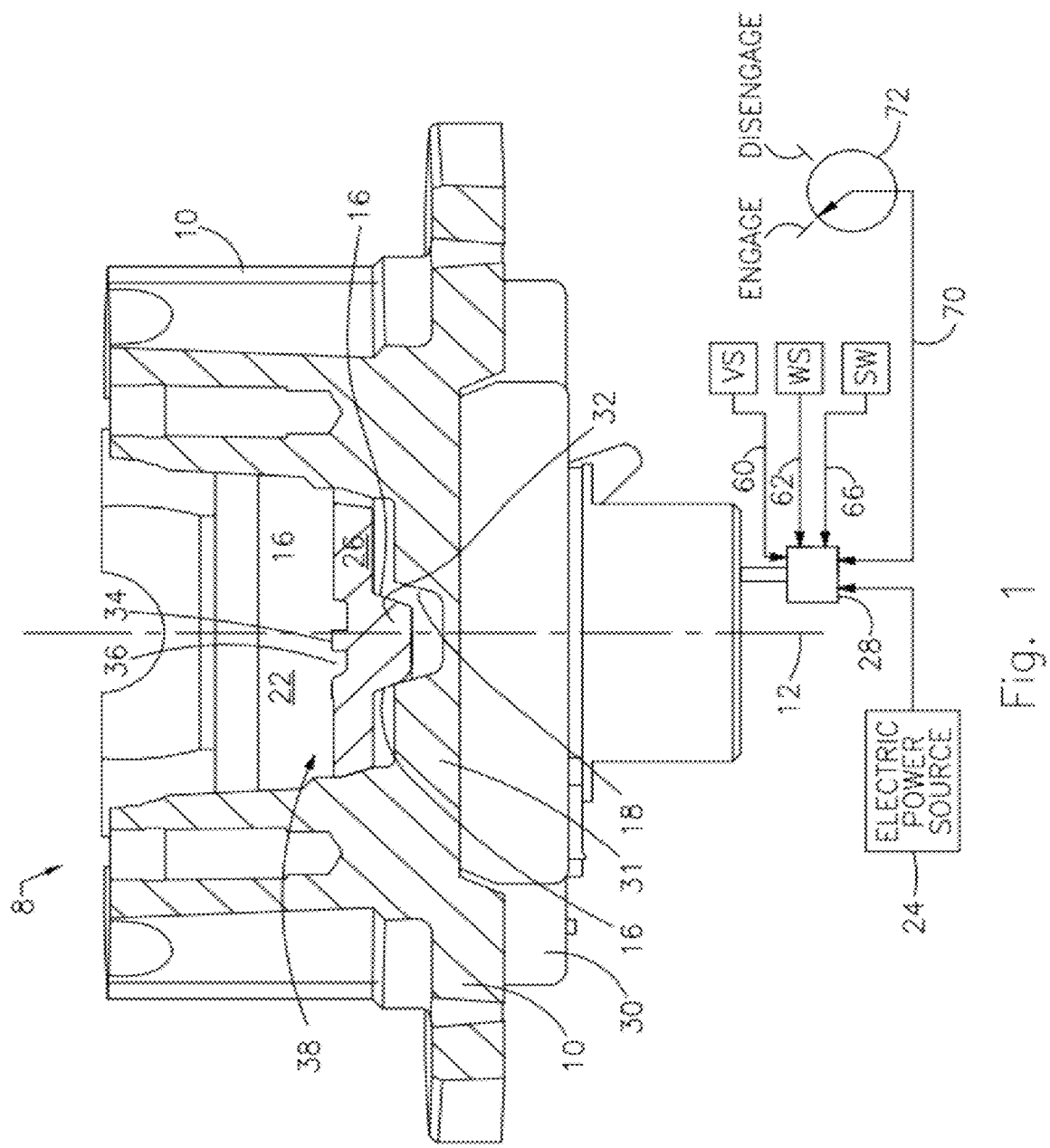
FIG. 1 is a cross section of an electronic locking differential assembly.
Figure 2:
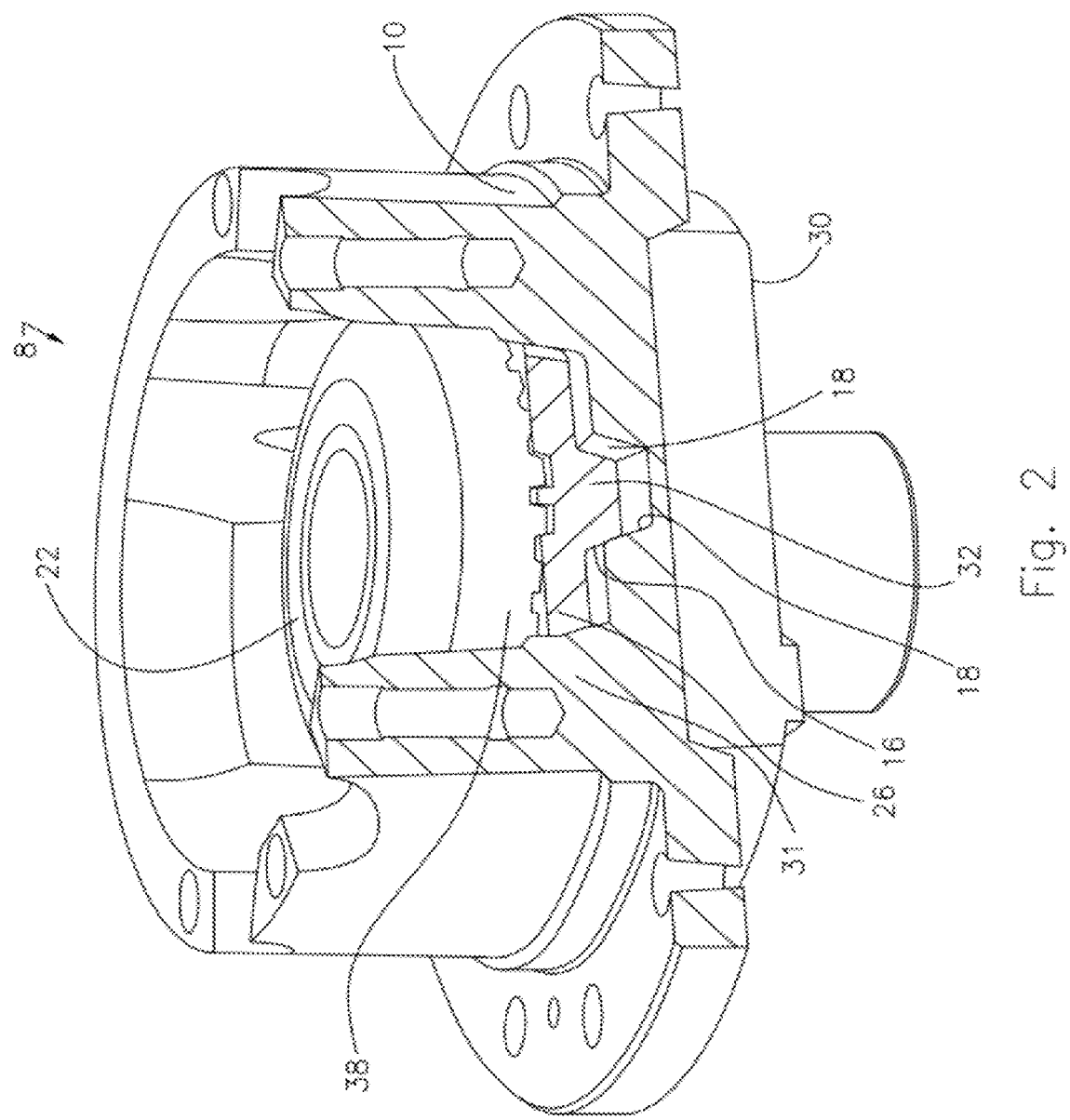
FIG. 2 is perspective side view of the cross sectional of FIG. 1.
Figure 3:
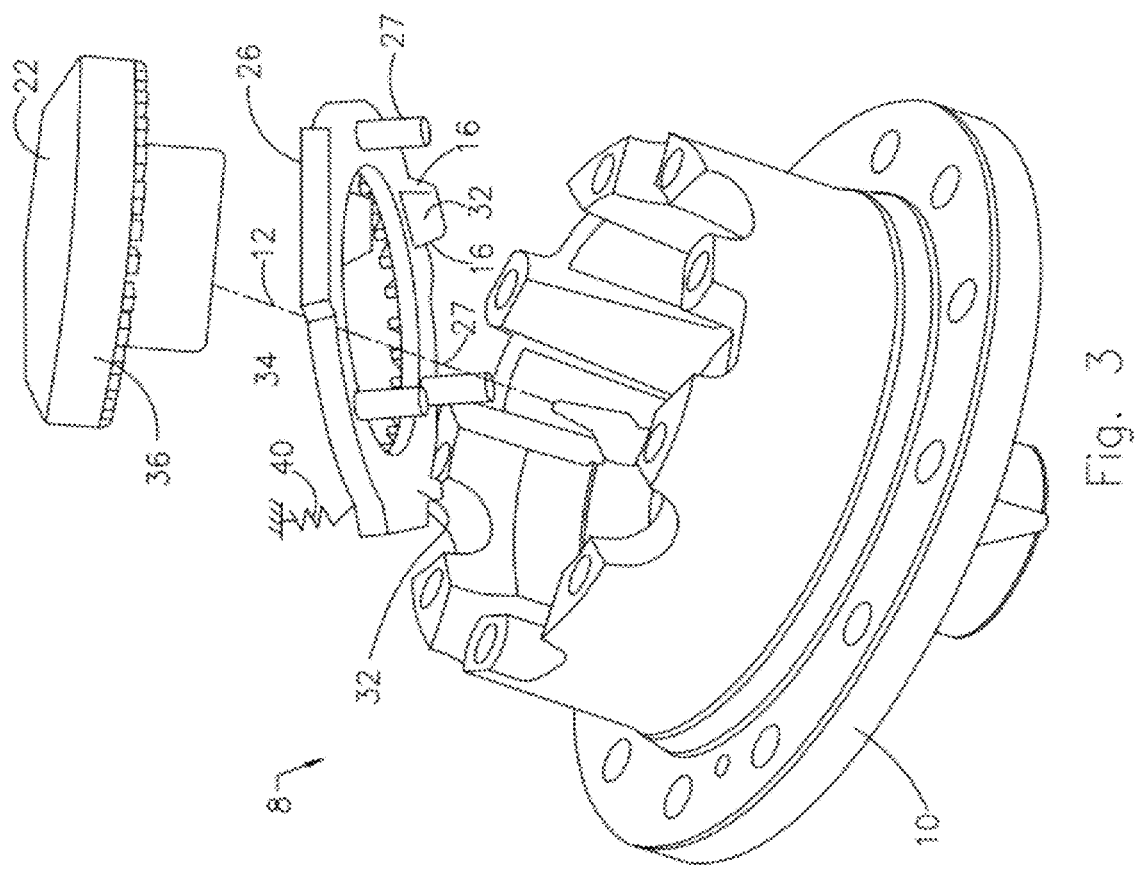
FIG. 3 is a perspective view of the differential assembly of FIG. 1 showing the differential case, side gear and locking ring spaced mutually.
Figure 4:
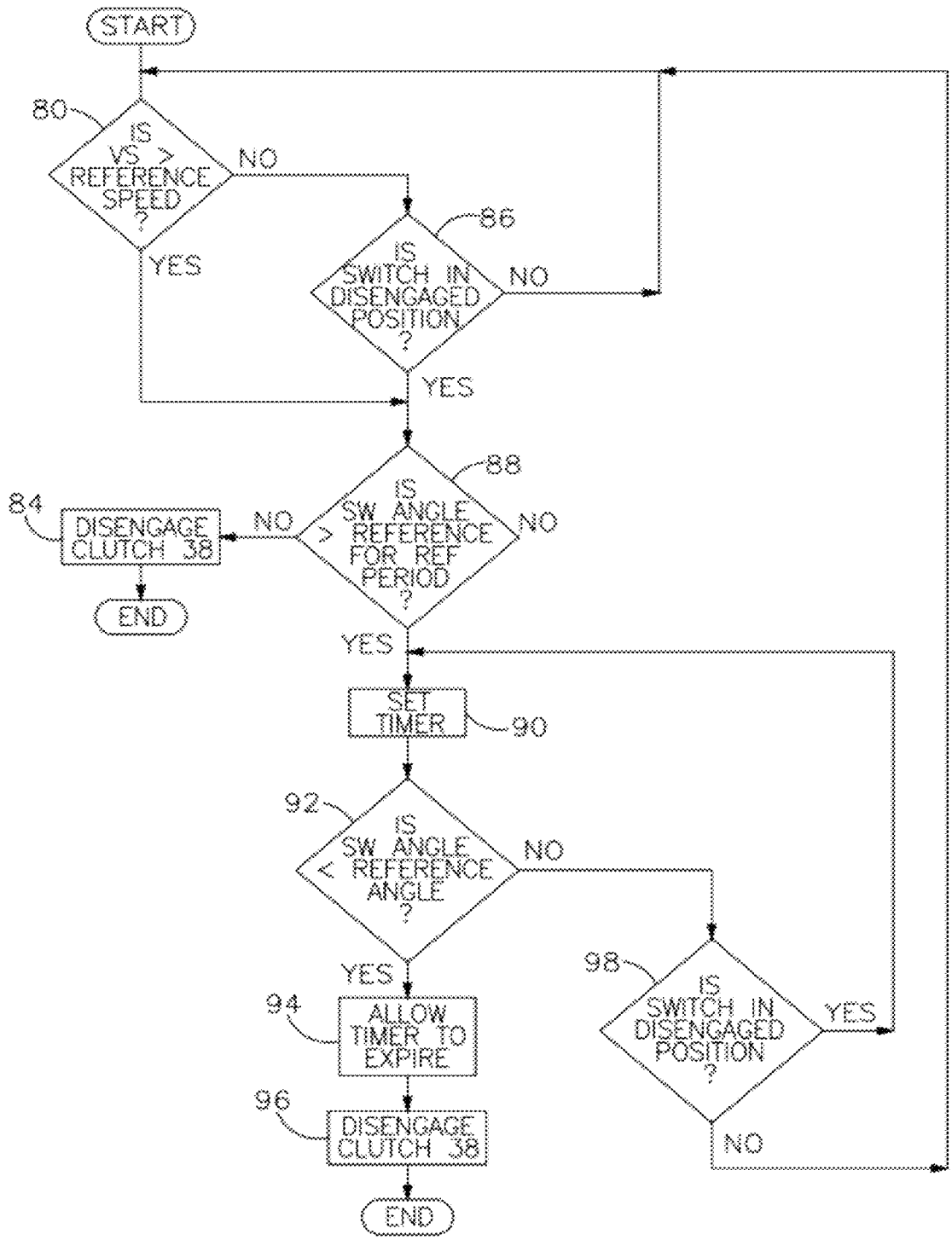
FIG. 4 is logic diagram of a strategy for controlling the state of the ELD clutch.

Referring to FIGS. 1-3, an electronically controlled differential mechanism 8 includes a differential case 10 arranged concentrically about an axis 12; ramps 16, 18; side gear 22; electric power source 24, locking ring 26, electronic controller 28, and electromagnetic coil 30. Ramps 16, formed on the locking ring, and ramps 18, formed on the differential case 10, are angularly spaced at three or four locations about axis 12 such that each of the ramps 16 is aligned angularly with one of the ramps 18.

Locking ring 26 is formed with angularly spaced posts 27, each post extending axially through a hole in a web 31 formed in case 10, thereby continually engaging the case 10 and the locking ring 26 for rotation as a unit, but permitting the ring to move axially independently of the case.

Locking ring 26 is formed also with angularly spaced legs 32, each leg 32 being formed with two ramps 16, and clutch teeth 34. Similarly, side gear 22 is formed with clutch teeth 36. The teeth 34, 36 of locking ring 26 and side gear 22 together comprise a clutch 38, which is actuated by coil 30 to engage the teeth 34, 36 mutually producing a drive connection between side gear 22 and locking ring 26. When coil 30 is deactivated, teeth 34, 36 disengage and permit side gear 22 and locking ring to rotate independently. The aligned ramps 16, 18 become mutually engaged when clutch 38 is engaging and engaged.

Many of these components of FIGS. 1-3 are illustrated in U.S. Pat. No. 7,399,248, the entire disclosure of which is incorporated herein by reference.

When energized, the electromagnetic coil 30 forces the locking ring 26 along axis 12 axially into mesh with the side gear 22, thereby mechanically linking the side gear to the differential case 10 and preventing differential speed between vehicle wheels, which are driveably connected through side gear 22 and another side gear (not shown) located at the opposite side of a the differential 8 from the side shown in FIGS. 1-3.

When the electromechanical coil 30 axially forces the locking ring 26 partially into mesh with the side gear 22, the ramps 16, 18, which are inclined with respect to axis 12, thrust the locking ring 26 into full mesh with the side gear 22. During engagement, current from the electric power source 24 is connected by controller 28 to the electromagnetic coil 30, overcoming the force of a return spring and causing the locking ring 26 to radially twist as it moves axially up the ramp 18, thereby forcing the lock ring into mesh with the side gear 22.

During disengagement, the controller 28 stops the current flow from the electric power source 24 to the electromagnetic coil 30. A return spring 40 pushes the lock ring 26 with a force, which radially twists the lock ring 26 as it moves axially down the ramp 18, forcing the locking ring out of engagement with the side gear 22, as shown in FIG. 2.

If differential speed of the driven wheels exists because the vehicle is turning or in a dynamic maneuver that would cause the vehicle wheels driven through the differential 8 to rotate at different angular velocities, then frictional force between the teeth 36 of the side gear 22 and the teeth 34 of the locking ring 26 greatly exceeds the force of return spring 40, thereby keeping ELD clutch 38 engaged.

The dog clutch 38, whose engagement grounds the side gear 22 to the differential case 12 through locking ring 26, cannot disengage while the vehicle is in a dynamic maneuver that would otherwise cause a speed differential between the driven wheels. To mechanically disengage the ELD clutch 38, the speed of the driven wheels must either be equal, such as when the vehicle is traveling straight, or the relative direction of the wheel speed must change, as when the vehicle turns, thereby unloading the dog clutch 38. Secondly, the return spring 40 must overcome the friction force between the locking ring 26 and differential case 10 multiplied by the cosine of the ramp angle Ø.

The ELD clutch 38 is electronically controlled either through a dash mounted manually-activated button 72 or passively through controller 28. The control strategy allows ELD activation and deactivation based upon calibrateable parameters including vehicle speed (VS), differential speed (WS) between the driven wheels and steering wheel angle (SWA).

Controller 28 receives electronic signals representing vehicle speed 60, speed 62 of the wheels 64 driven by differential 8, the angular displacement 66 of the steering wheel 68 from a centered position, and the engaged and disengaged state 70 of a switch 72, which state is manually-selected and indicates the desired state of clutch 52.

A strategy for controlling the state of clutch 38 is illustrated in the logic flow diagram of FIG. 3, which begins with lock mechanism clutch 52 engaged. At step 80 a test is made to determine whether the current vehicle speed is greater than a reference vehicle speed. If the result of test 80 is logically false, at step 86 a test is made to determine whether switch 72 is disengaged. If the result of test 86 is false, control returns to step 80.

If the result of test 86 is logically true, control passes to step 88. If the result of test 80 is true, i.e., positive or high, control also advances to step 88.

At step 88 a test is made to determine whether the angle 66 of steering wheel 68 is greater than a reference angle from the centered position of the steering wheel for the length of a second reference period. If the result of test 88 is false, control advances to step 84, where the clutch 38 is disengaged by deenergizing coil 30 and the control ends.

If the result of test 88 is true, at step 90 a timer is set to a reference countdown period length. The length of the countdown period is preferably a function of vehicle speed and vehicle gross weight.

At step 92, a test is made to determine whether the angle 66 of steering wheel 68 is less than a reference angle from the centered position of the steering wheel.

If the result of test 92 is true, at step 94 the timer is allowed to expire, thereby providing time for the axle shaft that is connected to side gear 22 to unwind torsionally.

When the time expires, at step 96 clutch 38 is disengaged by deenergizing coil 30, and the control ends.

If the result of test 92 is false, at step 98 a test is made to determine whether switch 72 is disengaged. If the result of test 98 is true, control returns to step 90. If the result of test 98 is false, control returns to step 80.

In accordance with the provisions of the patent statutes, the preferred embodiment has been described. However, it should be noted that the alternate embodiments can be practiced otherwise than as specifically illustrated and described.

The invention claimed is:

1. A method for controlling a clutch of an electronic locking differential for a vehicle, comprising the steps of:
    (a) determining either that a speed of the vehicle is greater than a reference speed or that a desired state of the clutch is a disengaged state;
    (b) determining that an angular displacement of a steering wheel from a reference position is less than a first reference angle;
    (c) disengaging the clutch;
    (d) using a controller to determine if neither the speed of the vehicle is greater than the reference speed nor the desired state of the clutch is the disengaged state, determining that the displacement of the steering wheel changes from greater than a second angle to less than the second angle;
    (e) disengaging the clutch after a first period expires.

2. The method of claim 1, wherein step (a) further comprises:
    using a manually operated switch to indicate the desired state of the clutch.

3. The method of claim 1, wherein step (b) further comprises:
    determining that said displacement is maintained for a length of a second period.

4. The method of claim 1, wherein step (c) further comprises:
    disconnecting a source of electric power from an electromagnetic coil that actuates the clutch.

5. The method of claim 1, wherein step (d) further comprises:
    determining that said displacement is maintained for a length of a third period.

6. A system for controlling an electronic locking differential for a vehicle, comprising:
    a clutch that alternately locks and unlocks the differential;
    a spring that urges the clutch to unlock;
    an electric power source;
    an electromagnetic coil that urges the clutch to lock in response to current applied to the coil from the electric power source; and
    a controller configured to determine either that a speed of the vehicle is less than a reference speed or that a desired state of the clutch is a disengaged state, determine that an angular displacement of a steering wheel from a centered position is less than a first reference angle, allow the clutch to unlock by opening an electric connection between the coil and the electric power source, to determine that the displacement of the steering wheel changes from greater than a second angle to less than the second angle, if neither the speed of the vehicle is less than the reference speed nor the desired state of the clutch is the disengaged state, and to disengage the clutch after a first period expires.

* * * * *